(12) United States Patent
Guo

(10) Patent No.: US 8,666,170 B2
(45) Date of Patent: Mar. 4, 2014

(54) COMPUTER SYSTEM AND METHOD OF MATCHING FOR IMAGES AND GRAPHS

(75) Inventor: Tao Guo, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 257 days.

(21) Appl. No.: 13/030,428

(22) Filed: Feb. 18, 2011

(65) Prior Publication Data

US 2012/0076409 A1    Mar. 29, 2012

(30) Foreign Application Priority Data

Sep. 29, 2010  (JP) .................................. 2010-218477

(51) Int. Cl.
*G06K 9/62* (2006.01)
*G06K 9/74* (2006.01)
*G06K 9/64* (2006.01)
*G06K 9/32* (2006.01)

(52) U.S. Cl.
USPC ........... 382/209; 382/294; 382/212; 382/215; 382/223

(58) Field of Classification Search
None
See application file for complete search history.

(56) References Cited

U.S. PATENT DOCUMENTS

| | | | |
|---|---|---|---|
| 6,711,293 B1 | 3/2004 | Lowe | |
| 7,650,047 B2 * | 1/2010 | Jin et al. | 382/294 |
| 8,520,903 B2 * | 8/2013 | Gupta et al. | 382/115 |
| 2005/0226536 A1 * | 10/2005 | Fasulo | 382/294 |
| 2006/0193535 A1 * | 8/2006 | Mishima et al. | 382/294 |
| 2007/0014488 A1 * | 1/2007 | Chen et al. | 382/294 |

OTHER PUBLICATIONS

B. Zitova et al., Image registration method: a survey, Image and Vision Computing 21 (2003), pp. 977-1000.

* cited by examiner

*Primary Examiner* — Randolph I Chu
(74) *Attorney, Agent, or Firm* — Mattingly & Malur, PC

(57) ABSTRACT

It is provided a computer system for matching between images/graphs comprising a processing unit, a storage unit, an input unit and a data recording unit, wherein the computer system includes a feature pattern generating unit for generating a set of feature patterns of the image and the graph from the received image and the received graph, segmenting each of the image and the graph into a plurality of regions centered on a sample point, and determining characteristics of the plurality of regions; a correspondence computing unit for computing correspondence between the image and the graph to be matched by comparing the generated feature patterns; a transform unit for transforming a coordinate system of at least one of the image and the graph to be matched; and a combination unit for combining the image and the graph that have been subjected to the transform of the coordinate system.

14 Claims, 9 Drawing Sheets

COMPUTER SYSTEM AND METHOD OF MATCHING FOR IMAGES AND GRAPHS

CLAIM OF PRIORITY

The present application claims priority from Japanese patent application JP 2010-218477 filed on Sep. 29, 2010, the content of which is hereby incorporated by reference into this application.

BACKGROUND OF THE INVENTION

This invention relates to a method of matching between images, between graphs, and between an image and a graph, and more particularly, to a method of extracting inherent characteristics of an image and a graph from neighboring regions to perform matching between the image and the graph.

There are increasing demands on integration of data extracted from multiple sources along with development of computer technologies. Image matching is one of most important technologies for data integration. A large number of literatures are also available, such as Barbara Zitova and Jan Flusser, Image registration methods: a survey, Image and Vision Computing 21 (2003), pp. 977-1000, October 2003. The conventional methods of image matching are almost based on deriving correspondence among feature points which are firstly extracted as corner points, cross points, edges, and the like from both image pairs. Intersections and roads are used as feature points to be extracted from a map. Scale invariant feature transform (SIFT), which handles a local feature value, is popular and commonly known as an exemplary method for finding invariant feature points with high performance, as described in, for example, U.S. Pat. No. 6,711,293.

The above-mentioned conventional technologies have a premise that feature points must exist in both images, and therefore require the images with similar modules, which means that images may be taken from different sensors with different imaging conditions such as angles, illumination, and occlusion, but pixels of the images of the same object need to represent similar physical attributes, for example, two pictures of the same object taken from different locations, or a satellite image and an aerial photo of the same place.

However, for different types of data, such as an image and a map, or a visible image and a thermal image, the feature points extracted therefrom represent totally different physical attributes, which are not feasible to consider the correspondence thereamong. Therefore, the conventional image matching technologies cannot directly be applied to matching between an image and a graph, between images with different modules, and between graphs with different modules.

The conventional image matching methods cannot directly be applied to matching between an image and a map because the feature points extracted from the image do not necessarily correspond to the nodes of the map. The conventional matching between an image and a map is performed through selection of ground control points (GCPs) from both the image and the map, which is equivalent to setting up of corresponding feature points, and no knowledge of the image and the map are directly utilized. Accordingly, it is difficult to automate the matching between an image and a map.

In view of the above, this invention has an object to automatically obtain a feature value to be used for matching between an image and a graph (or between images or between graphs) with different attributes.

A representative aspect of this invention is as follows. That is, there is provided a computer system for matching between images, between graphs, and between an image and a graph, the computer system comprising: a processing unit for executing a program; a storage unit for storing the program executed by the processing unit; an input unit for receiving at least two of the image and the graph to be matched; a data recording unit for storing, in a storage device, the received image and the received graph; a feature pattern generating unit for generating a set of feature patterns of the image and the graph by reading the received image and the received graph from the storage device, segmenting each of the read image and the read graph into a plurality of regions centered on each of a plurality of sample points, and determining characteristics of the plurality of regions obtained through the segmentation; a correspondence computing unit for computing correspondence between the image and the graph to be matched by comparing the generated feature patterns; a transform unit for transforming a coordinate system of at least one of the image and the graph to be matched based on the computed correspondence; and a combination unit for combining the image and the graph that have been subjected to the transform of the coordinate system.

According to the representative embodiment of this invention, the automatic, precise matching between the image and the graph can be realized while saving time therefor.

BRIEF DESCRIPTION OF THE DRAWINGS

The present invention can be appreciated by the description which follows in conjunction with the following figures, wherein.

DETAILED DESCRIPTION OF THE PREFERRED EMBODIMENT

Now, an embodiment of this invention is described by referring to the accompanying drawings.

Inspired by the manual selection of GCPs, the inventors of this invention have tried to find local areas with some special characteristics, rather than directly finding feature points. The inventors propose a novel method to extract inherent characteristics of an image and a map using a feature pattern, which is defined by a sequence of feature vectors extracted from neighboring regions. Compared with the feature point, the feature pattern is insensitive to local changes and highly effective for extraction of characteristics in a certain range. Thus, the feature pattern is robust in finding similarity in different types of image and map.

Figure 3:
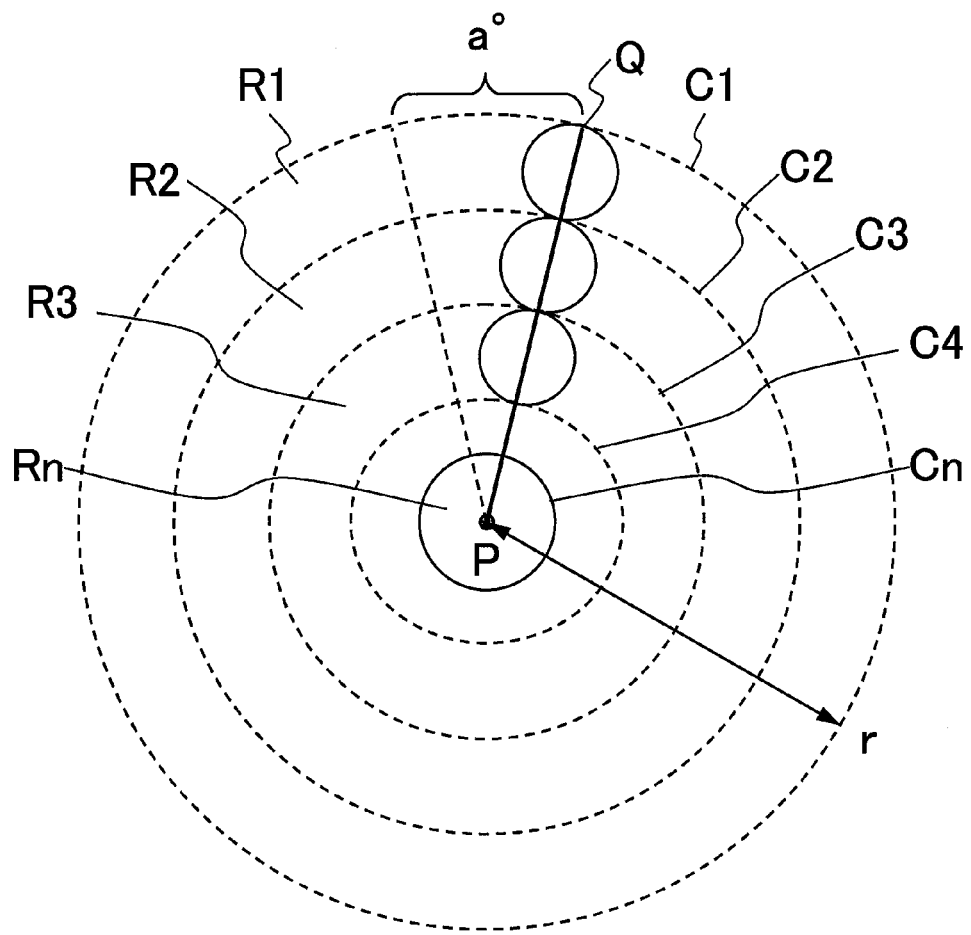
FIG. 3 is an explanatory diagram illustrating a concept of a matching method according to the embodiment of this invention.
Figure 7:
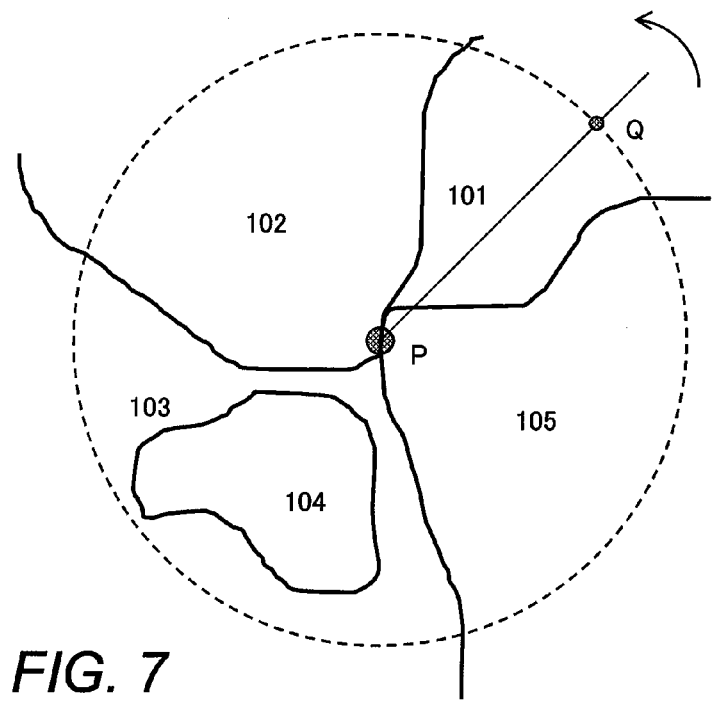
FIG. 7 is an explanatory diagram illustrating an example of an image (aerial photo) to be processed by the matching process according to the embodiment of this invention.
Figure 8:
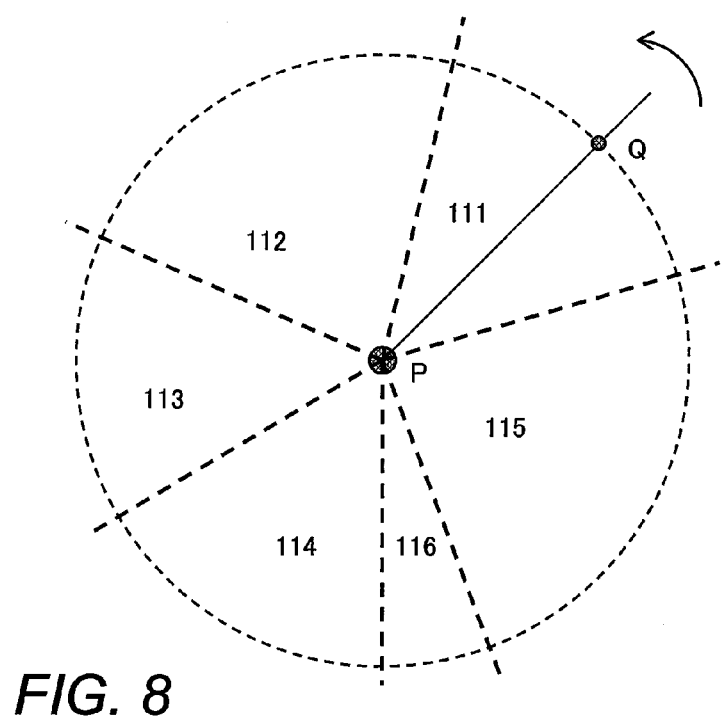
FIG. 8 is an explanatory diagram illustrating an example of a graph (map) to be processed by the matching process according to the embodiment of this invention.

This invention has a feature of finding correspondence between objects to be matched (image and graph). As illustrated in FIG. 3, for example, a point P is surrounded by regions Rn, . . . R3, R2, and R1. There are few feature points found in this case, but the characteristics of the feature pattern are obvious. Further, as illustrated in FIGS. 7 and 8, which indicate an image (aerial photo) and a map of the same area, respectively, the image and the map share few common feature points because of big local changes but share similar patterns in neighboring regions.

Without loss of generality and for the convenience of description herein, the image refers to a visible image and the graph refers to a digital map if no specific description is given, and description is herein given of an example in which this invention is applied to matching between an image and a map. However, this invention is surely applicable to matching between images and between graphs irrespective of whether or not the images or the graphs have similar modules.

(System Configuration)

Figure 1:
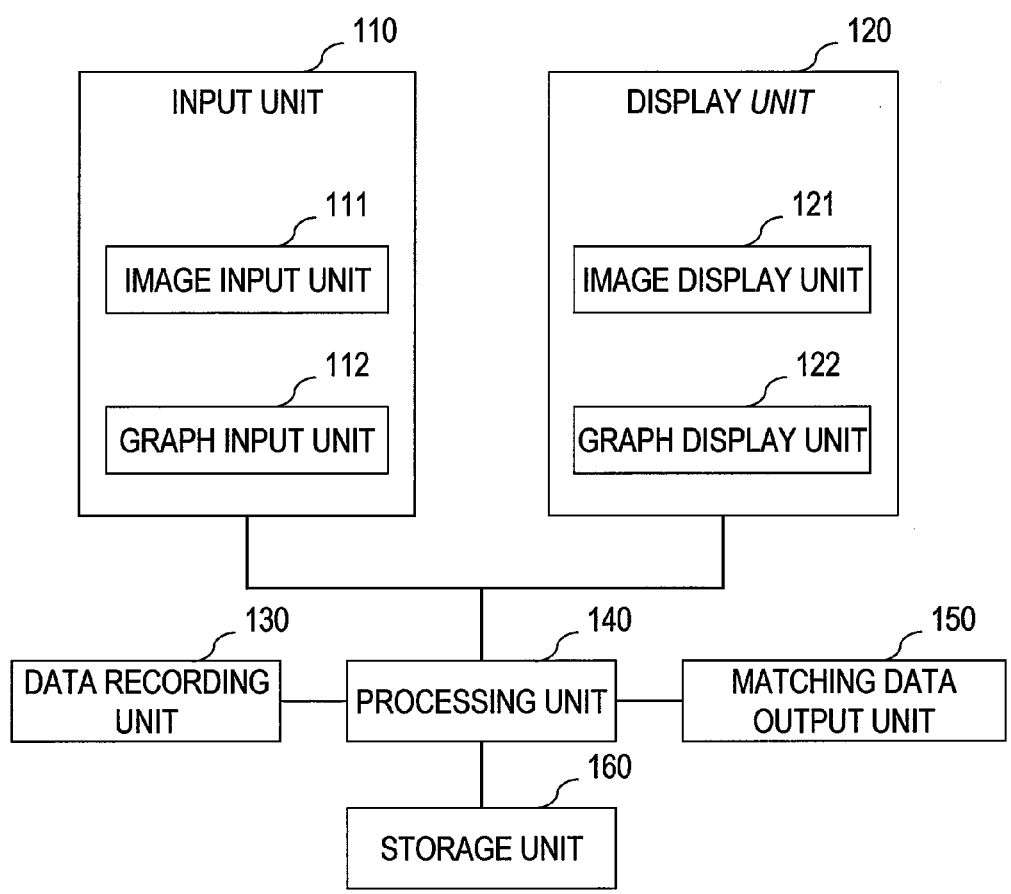
FIG. 1 is a block diagram illustrating a configuration of a matching system according to an embodiment of this invention.

FIG. 1 is a block diagram illustrating a configuration of a matching system according to the embodiment of this invention.

The matching system according to this embodiment is a computer including an input unit 110, a display unit 120, a data recording unit 130, a processing unit 140, a matching data output unit 150, and a storage unit 160. The input unit 110, the display unit 120, the data recording unit 130, the matching data output unit 150, and the storage unit 160 are connected to one another via the processing unit 140 (or a bus).

The input unit 110 includes an image input unit 111 and a graph input unit 112. The image input unit 111 is a device through which an image such as an aerial photo is input, while the graph input unit 112 is a device through which a digital map is input. The image input unit 111 and the graph input unit 112 are constituted by, for example, an optical disk drive or a USB interface. It should be noted that the image input unit 111 and the graph input unit 112 may be the same input device or separate input devices.

The display unit 120 includes an image display unit 121 and a graph display unit 122. The image display unit 121 is a display device for displaying an image processed by the matching system. The graph display unit 122 is a display device for displaying a graph (for example, digital map) processed by the matching system. It should be noted that the image display unit 121 and the graph display unit 122 may be the same display device or separate display devices.

The data recording unit 130 is a non-volatile storage device for storing image data and graph data to be processed by the matching system, and is constituted by, for example, a hard disk drive or a non-volatile memory. The processing unit 140 includes a processor, which executes a program to execute the processes in this system.

The matching data output unit 150 is a device for outputting results obtained through the processes executed in the matching system, and is constituted by, for example, a printer or a plotter. The storage unit 160 is a storage device for storing the program to be executed by the processing unit 140, and is constituted by, for example, a hard disk drive or a non-volatile memory.

(Processes)

Figure 2:
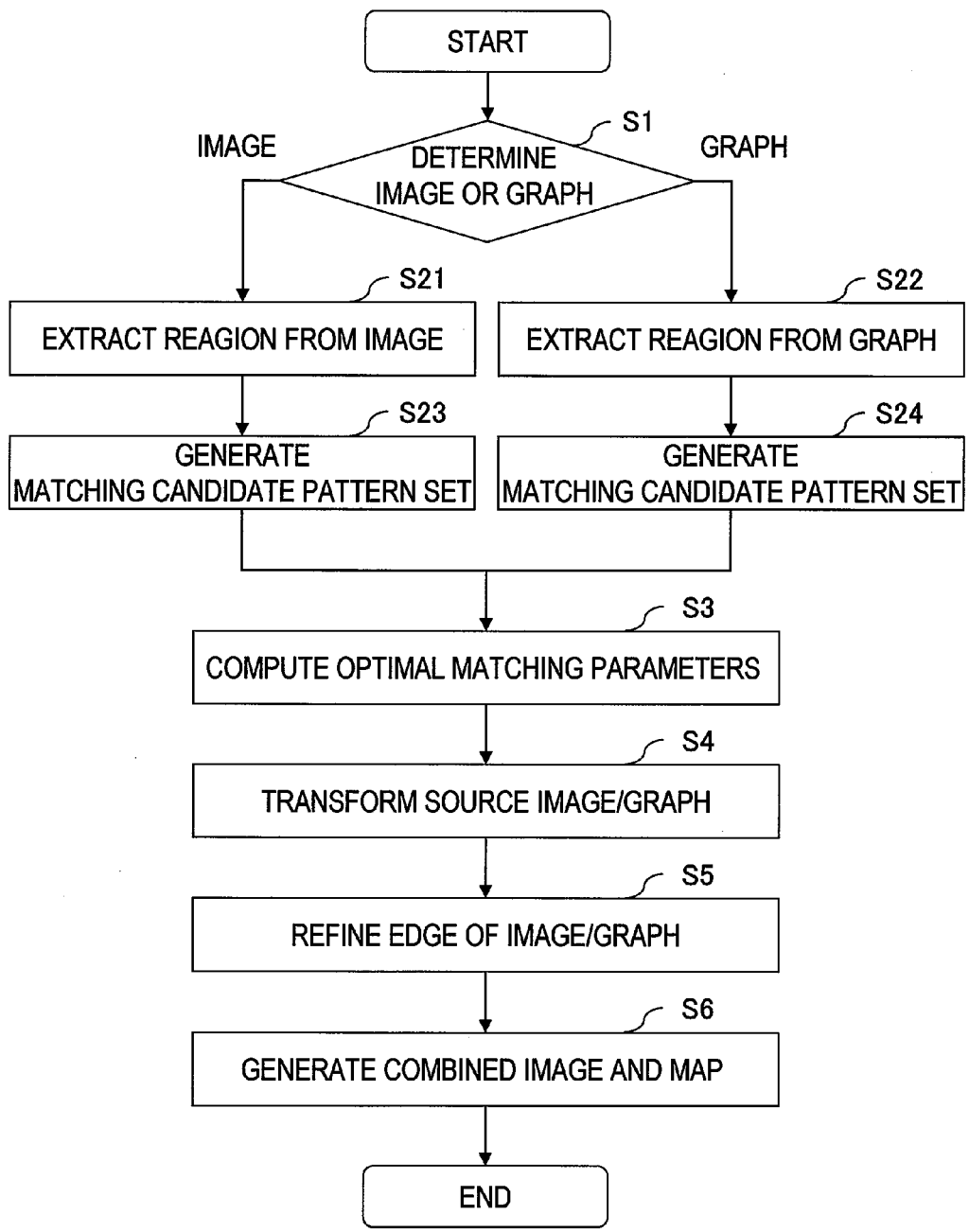
FIG. 2 is a flow chart illustrating an overall matching process according to the embodiment of this invention.

FIG. 2 is a flow chart illustrating an overall matching process according to the embodiment of this invention. The matching process according to this embodiment includes selecting a sample point from an image and graph to be matched, extracting a feature pattern based on characteristics of regions neighboring the selected sample point, and performing matching between the image and the graph using a good feature pattern feasible for the matching process, which is selected from among the extracted feature patterns.

In this embodiment, there is described a matching process for an aerial photo image and a digital map, but this process is also applicable to matching between images or between graphs. The input image may be other types of picture than the aerial photo, such as a tomographic image of a human body. The input digital map is formed of a link connecting nodes.

First, an input as to whether the input data is an image or a graph is received, and based on the received input, it is determined whether the input data is an image or a graph (S1).

In a case where it is determined as a result that the input data is an image, the process proceeds to Step S21, in which regions to be used for the matching are extracted from the input image, and then pixel values of pixels included in each extracted region are used for grouping the pixels. The grouping process using the pixel values is described later. After that, a matching candidate pattern set is generated (S23). The process of Step S23 is described later referring to FIG. 6.

In a case where it is determined that the input data is a graph, on the other hand, the process proceeds to Step S22, in which, as in the above-mentioned case of Step S21 for the image, regions to be used for the matching are extracted from the input graph, and then pixel values of pixels included in each extracted region are used for grouping the pixels. After that, a matching candidate pattern set is generated (S24). The generation process for the matching candidate pattern set is the same as the generation process for the matching candidate pattern set of the image (S23), which is described later referring to FIG. 6.

In the grouping process for the pixels, specifically, of the pixels included in each extracted region, significant pixels satisfying a given condition are distinguished from insignificant pixels. In the case of the graph (map), the given condition to be used may be, for example, a condition as to whether or not any point (node) or line (link) exists in the determination subject pixels. In the case of the image, on the other hand, the determination may be made using a given threshold to be compared with numerical values varying from pixel to pixel. For example, luminance of the pixels is used for counting a number $A_i$ of the pixels having high (or low) luminance. Alternatively, saturation (chromaticity) of a specific color may be used for the determination. As the specific color, one of three primary colors (red, green, and blue) of an RGB model may be used. Alternatively, a value of hue, saturation, or lightness of an HLS model may be used.

In other words, in the grouping process for the pixels, each extracted region is transformed into a multi-level image (e.g. an image showing binaries) under the given condition, to thereby group the pixels.

After the matching candidate pattern sets of the image (aerial photo) and graph (map) to be matched are generated, optimal matching parameters are computed for the matching (S3). The optimal matching parameters may be computed by using, for example, the RANSAC method based on the method of least squares.

Then, one of the image and graph to be matched is defined as a source image/graph, and the other is defined as a destined image/graph. Then, the optimal matching parameters are applied to the source image/graph for geometric transform of coordinates of the source image/graph, and the source image/graph after the geometric transform is superimposed on the destined image/graph (S4). It should be noted that FIG. 2 illustrates an example of geometric transform from a graph into an image, but the geometric transform may be performed on an image to obtain a graph.

After that, a refinement process of refining boundaries is performed (S5). The refinement process is performed through local deformation of one or both of the superimposed image and graph for matching between modules included in the image and the graph, to thereby reduce derivatives of the modules included in the image and the graph. The refinement process is described later referring to FIGS. 7 to 10. It should be noted that the refinement process is optional.

Finally, data is generated by combining the superimposed image and map (S6).

Hereinbelow, a concept of a matching method according to this embodiment is described.

FIG. 3 is an explanatory diagram illustrating the concept of the matching method according to the embodiment of this invention.

The matching method according to this embodiment includes segmenting the peripheral region of a sample point P into given regions, defining characteristics of each segmented region to generate feature vectors, and combining the plurality of feature vectors thus generated to generate a feature pattern.

After the feature patterns are generated, it is determined which feature patterns are significant, in other words, the good feature patterns are determined. The good feature pattern must include a large number of regions. As described above, a feature vector having all the elements equal to 1 is a central vector. The feature vector represents each region in pattern, and the central vector has the richest feature information. Therefore, an angle between a given feature vector and the central vector is computed as a vector angle of the feature vector. This angle indicates the closeness of the feature vector to the central vector. This angle is also applicable to determination of the richness of pattern information contained in the feature pattern. In this embodiment, the good feature patterns are determined using an equation described later.

Specifically, as illustrated in FIG. 3, the sample point P is set as a center to define a circle C1 having a given radius, and then circles C2, C3, ... and Cn are defined inside the circle C1 according to distances from the sample point P. Then, the region R1 is defined through segmentation performed with the circle C1 set as its outer periphery and with the circle C2 set as its inner periphery. Similarly, the region R2 is defined in an inner part than the region R1 through segmentation performed with the circle C2 set as its outer periphery and with the circle C3 set as its inner periphery. Further, the region R3 is defined in an inner part than the region R2 through segmentation performed with the circle C3 set as its outer periphery and with the circle C4 set as its inner periphery. In this manner, the regions R1, R2, R3, ... and Rn are defined concentrically so that the region Rn is positioned innermost.

Then, in this embodiment, a moving point Q that moves by a central angle $a°$ each time is defined on the circle C1, and a scan line PQ is defined with the moving point Q and the sample point P set as its ends. On the scan line PQ, the pixels of the regions R1 to Rn are detected. As described above, in Steps S21 and S22, the pixels are grouped into significant pixels and insignificant pixels.

It should be noted that, as described later, the moving point Q moves along the outermost circle C1 by the central angle $a°$ each time, and the scan line PQ rotates by the central angle $a°$ each time with the sample point P set as the rotation center, to thereby cover the entire region inside the circle C1 centered on the sample point P and having a radius r. In other words, the number of feature vectors obtained for the scan lines PQ is 360/a. When the value a is set to a small value, small characteristics of the image and the map can be detected, resulting in highly precise matching between the image and the map. When the value a is set to a large value, on the other hand, high-speed matching operation between the image and the map can be realized.

The sample point P may be selected from among all the pixels in the image and the map from which the feature patterns are to be extracted, or selected from among pixels positioned at given intervals (for example, every other pixel or every ten pixels).

Figure 4:
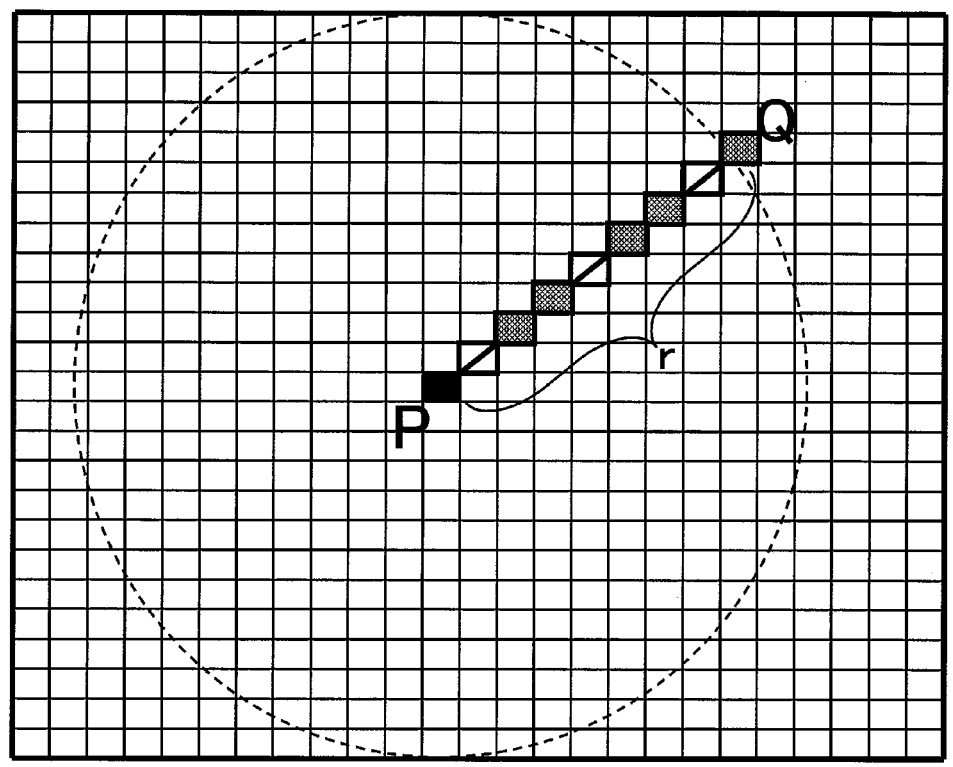
FIG. 4 is an explanatory diagram illustrating a normalized feature value of a feature vector according to the embodiment of this invention.

FIG. 4 is an explanatory diagram illustrating a normalized component value of the feature vector according to the embodiment of this invention, in which the sample point P and the scan line PQ are illustrated.

In this embodiment, a normalized component value $K(i,j)$ of the feature vector within an i-th region Ri is obtained using Equation [1]. Specifically, the number Ai of the significant pixels grouped in Steps S21 and S22 is counted among the pixels within the region Ri on the scan line PQ, and a total number N of the pixels within the region Ri on the scan line PQ is counted. Then, Ai is divided by N using Equation [1], to thereby obtain the normalized component value $K(i,j)$ of the feature vector.

$$K(i, j) = \frac{A_i}{N}, N > 0 \qquad [1]$$

In other words, in the above-mentioned example of the map, when a point or a line exists in all the pixels within the region Ri on the scan line PQ, the subject pixels are all determined as the significant pixels that do not represent a background of the map, and thus the normalized component value $K(i,j)$ exhibits 1. When all the pixels within the region Ri on the scan line PQ represent the background of the map, on the other hand, the subject pixels are all determined as the insignificant pixels, and thus the normalized component value $K(i,j)$ exhibits 0. The normalized component value $K(i,j)$ thus obtained corresponds to the element of the feature vector.

Figure 5:
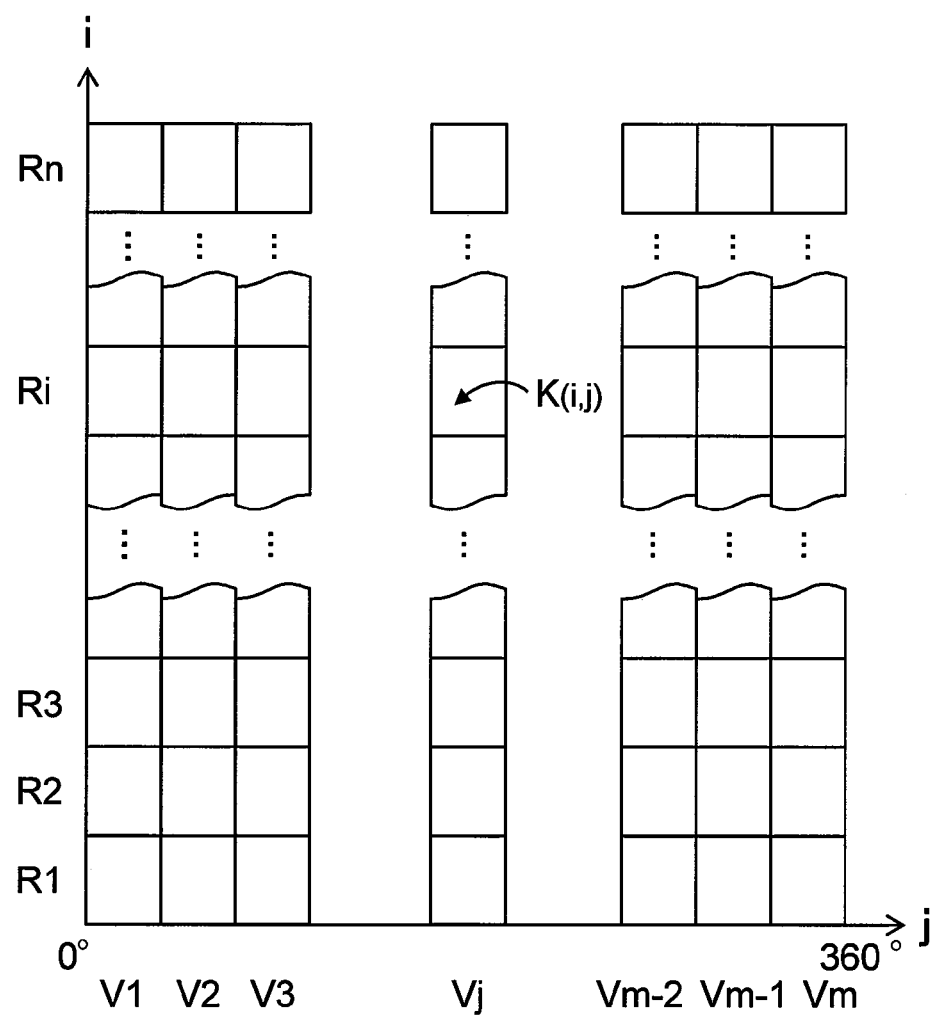
FIG. 5 is an explanatory diagram illustrating the feature vectors constituting a feature pattern according to the embodiment of this invention.

FIG. 5 is an explanatory diagram illustrating the feature vectors constituting the feature pattern according to the embodiment of this invention.

The feature pattern obtained for each sample point (feature point) is constituted by a sequence of the feature vectors, and is a two-dimensional matrix having m×n elements.

In FIG. 5, Ri represents one of the regions obtained through segmentation by the circles C1, ... and Cn centered on the sample point P, and n represents the number of regions obtained through the segmentation. Further, Vj represents a one-dimensional feature vector obtained for each scan line PQ, and is expressed by Equation [2].

$$V_j = [K_{(1,j)}, K_{(2,j)}, \ldots, K_{(i,j)}, \ldots, K_{(n,j)}] \quad [2]$$

m represents the number of scan lines included in a single feature pattern, in other words, the number of feature vectors, and is obtained based on m=360/a. The parameter a represents the angle between the scan lines PQ illustrated in FIG. 3. Each of the feature vectors has n elements, and each of the elements K(i,j) corresponds to the component value obtained by normalizing the pixels included in the region Ri.

Figure 6:
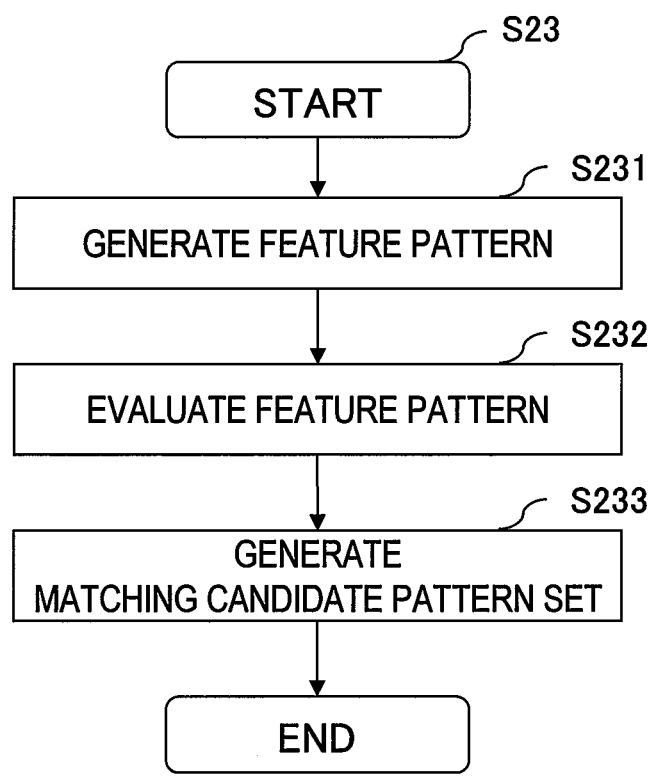
FIG. 6 is a flow chart illustrating details of a generation process for a matching candidate pattern set according to the embodiment of this invention.

FIG. 6 is a flow chart illustrating details of the generation process for the matching candidate pattern set (S23, S24) according to the embodiment of this invention.

First, the sample point is selected from among the pixels included in the input image (or map), and the feature pattern of the selected sample point is generated (S231). The sample point (pixel) may be selected from among all the pixels or selected from among pixels positioned at given intervals (for example, every ten pixels). The feature pattern generated in this step is constituted by the plurality of feature vectors as illustrated in FIG. 5. The process of Step S231 is repeated for all the sample points.

After the process of Step S231 is finished for all the sample points, the feature patterns of the respective sample points are evaluated (S232). In this evaluation, an angle θj between the feature vector Vj and the central vector is first computed using Equation [3]. The central vector refers to a vector having all the elements equal to 1. Further, in Equation [3], n represents the number of regions obtained through the segmentation.

$$\theta_j = \cos^{-1}\left(\frac{\sum_{i=1}^{n} K_{(i,j)}}{\sqrt{\sum_{i=1}^{n} (K_{(i,j)})^2}}\right) \quad [3]$$

Subsequently, the angles θj of the feature vectors Vj are averaged using Equation [4], and an angle θ is obtained for each feature pattern. In Equation [4], m represents the number of feature vectors included in the feature pattern.

$$\theta = \frac{\sum_{j=1}^{m} \theta_j}{m} \quad [4]$$

Finally, the feature pattern is determined using Equation [5]. Specifically, in Equation [5], when f=1, the feature pattern is determined as a good feature pattern, while when f=0, the feature pattern is determined as a bad feature pattern. In Equation [5], α represents a determination threshold (allowable error), and a value of from 0° to 45° (for example, 30°) may be used therefor. When the value α is set to a large value, the feature pattern is more likely to be determined as the good feature pattern, with the result that more feature points may be obtained and used for the matching between the image and the map. When the value α is set to a small value, on the other hand, the feature pattern is less likely to be determined as the good feature pattern, with the result that more significant feature points may be obtained and used for the matching between the image and the map.

$$f = \begin{cases} 1 & 0 \le \theta \le \alpha \\ 0 & \alpha < \theta < (180 - \alpha) \\ 1 & (180 - \alpha) \le \theta \le 180 \end{cases} \quad [5]$$

In other words, in the determination process for the feature pattern according to this embodiment, when a large number of significant pixels are included in the pixels that are used for defining the normalized component value K(i,j), K(i,j) approximates 1, with the result that θ approximates 0° or 180°. In this case, the feature pattern is determined as the good feature pattern. When only a small number of significant pixels are included in the pixels that are used for defining the normalized component value K(i,j), on the other hand, θ approximates 90°. In this case, the feature pattern is determined as the bad feature pattern.

After that, feature patterns in which at least one of the sample point of the image and the sample point of the map corresponding thereto has been evaluated to be bad are ignored, and feature patterns in which both the sample point of the image and the sample point of the map corresponding thereto have been evaluated to be good are extracted, to thereby generate the matching candidate pattern set including the extracted feature patterns (S233).

The feature patterns that have been determined to be good may further be grouped in a range in which an average of the angles of the feature patterns in the group becomes smaller than a given threshold. The grouping of the feature patterns may be used for searching for the center of the feature patterns, to thereby keep a feature pattern closest to the center and to remove the other feature patterns included in the group. In this manner, only the feature pattern representative of the image/graph to be matched can be used for the matching process, resulting in reduced computer resources for the matching process.

It should be noted that, of the grouped feature patterns, a feature pattern positioned at the center indicated by the average value of the angles may be generated, and the generated feature pattern at the center may be used as the representative of the feature patterns in the group.

As described above, according to this embodiment, the average of the angles of the feature vectors Vj is obtained at the single sample point P and the sample point P related to the significant pixels is thus extracted as the feature point, to thereby generate the matching candidate pattern set of each of the image and the map (graph).

It should be noted that a process of matching the scales of the image and map to be matched may be performed before Step S231. In this case, a smaller scale only needs to be matched to a larger scale.

Next, referring to FIGS. 7 to 10, the refinement process (S5 of FIG. 2) is described.

FIG. 7 illustrates an example of the image (aerial photo) subjected to the matching process according to this embodiment. The image illustrated in FIG. 7 includes a plurality of classified regions 101 to 105. The boundaries found in the picture are normally coarse and ambiguous because of the ambiguity of pixels in the picture.

FIG. 8 illustrates an example of the graph (map) subjected to the matching process according to this embodiment. The map illustrated in FIG. 8 includes a plurality of classified classes 111 to 116. As described above, the map is formed of the link connecting the plurality of nodes, and hence the pixels in the map are obvious.

Therefore, in many cases, the classes in the image and the classes in the map are not necessarily aligned, and may be totally different locally. It is difficult to extract feature points from both the image and the map, and not all the extracted feature points are related therebetween. However, the image and the map can be matched because of the existence of some degrees of similarity.

The conventional feature points based matching methods are not able to handle these similar types matching, because the similarities do not exist in locations and distribution of feature points, but the general distribution of patterns. Therefore the this embodiment is able to find these high level (hidden) similarities to achieve highly accurate matching with a big tolerance.

Figure 9:
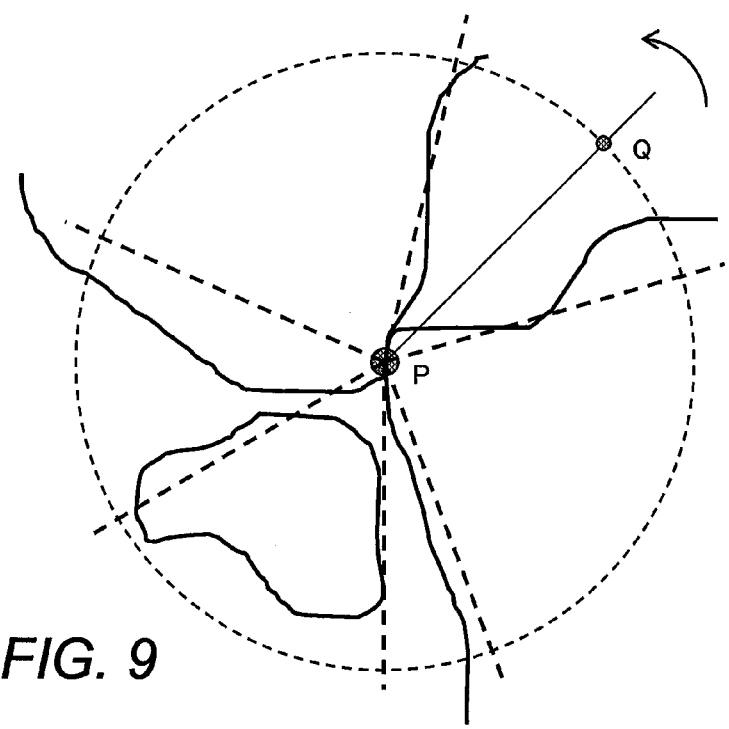
FIG. 9 is an explanatory diagram illustrating the image and the map superimposed on each other according to the embodiment of this invention.

As described above, the feature pattern is represented by the sequence of the feature vectors. Therefore, it is possible to build up correspondence between the feature point in the image and the feature point in the map. FIG. 9 illustrates the image and the map superimposed on each other based on the computed optimal parameters, and FIG. 10 illustrates the refinement process involving the local deformation of the boundaries.

Referring to FIG. 9, the class 101 in the image corresponds to the class 111 in the map, the class 102 in the image corresponds to the class 112 in the map, and the class 105 in the image corresponds to the class 115 in the map.

However, the boundaries between the classes in the map and the boundaries between the classes in the picture are not completely aligned, and therefore there is a derivative therebetween. For this reason, the refinement process involving the local deformation of the boundaries is performed to align the boundaries between the classes in the map and the boundaries between the classes in the picture. The boundaries between the classes in the map and the boundaries between the classes in the picture are determined by extracting edges from the map and the picture, respectively. Then, the edges extracted from one of the map and the picture are fitted with the edges extracted from the other, to thereby align the boundaries in the map and the boundaries in the picture.

Figure 10:
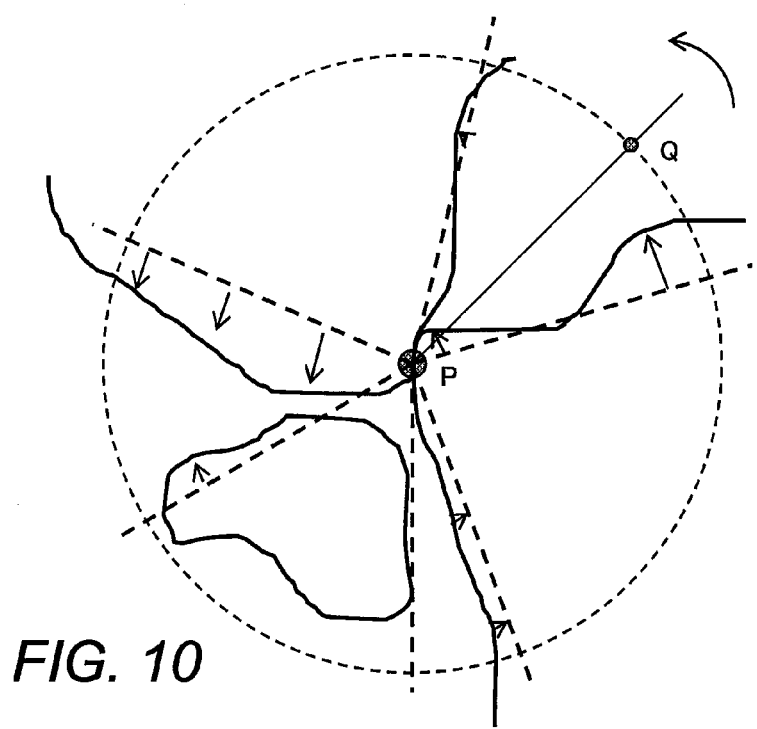
FIG. 10 is an explanatory diagram illustrating a refinement process for refining the image and the map according to the embodiment of this invention.

It should be noted that a refinement process of aligning the boundaries in the map with the boundaries in the picture is performed in FIG. 10, but a refinement process of aligning the boundaries in the picture with the boundaries in the map may be performed instead. A user may set the boundaries to be used as a reference and the boundaries to be deformed. After that, the matched image and map are combined with each other and are output as a new data set (S6 of FIG. 2).

Next, description is given of a modified example in which scaling is performed when the feature pattern is generated.

Figure 11:
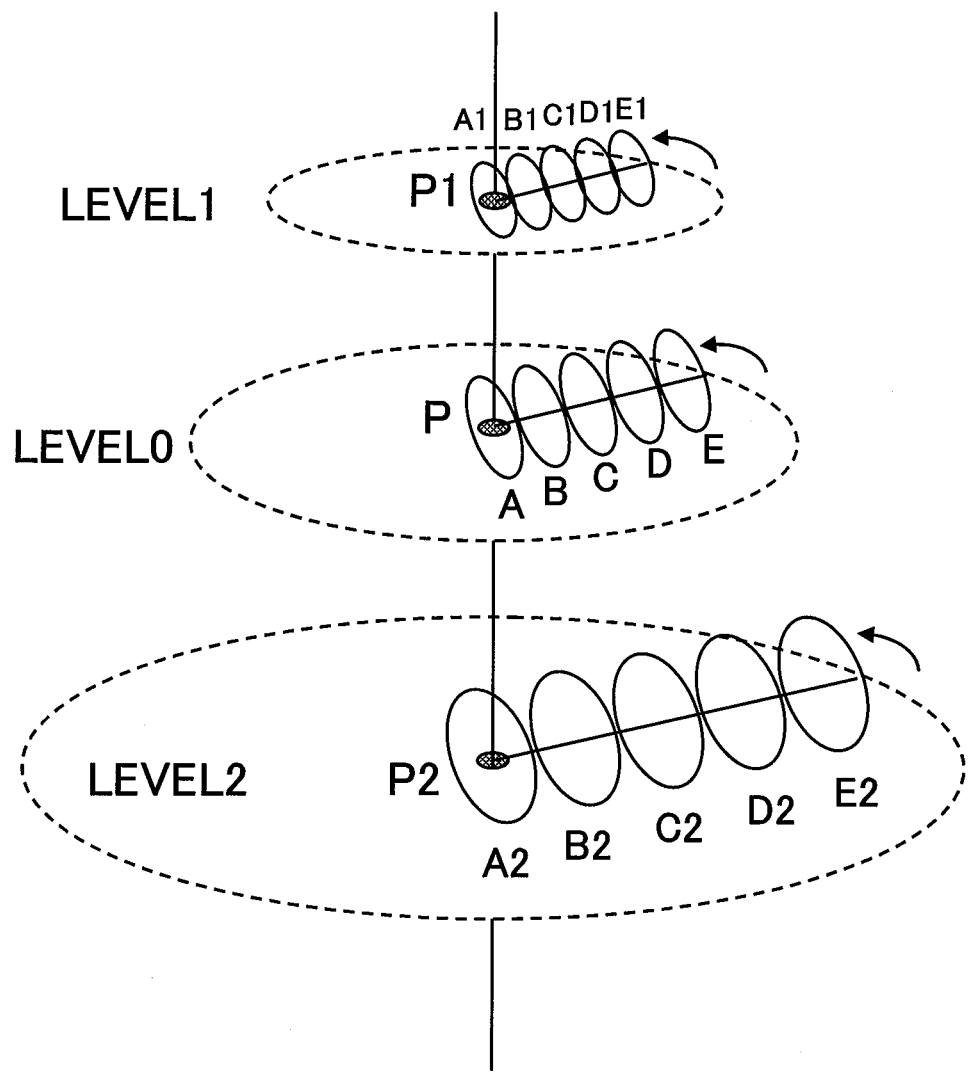
FIG. 11 is an explanatory diagram illustrating changing of a scales of the image and the map, which is executed before the feature pattern is generated according to the embodiment of this invention.

FIG. 11 is an explanatory diagram illustrating changing of the scales of the image and the map, which is executed before the feature pattern is generated.

Because the feature pattern captures feature information from a rather bigger area than the feature point does, the feature pattern becomes insensitive to local changes even in the case of missing and distortion of local information. In order to improve the robustness to the scale change, as illustrated in FIG. 11, a pyramid scheme is applied while generating the feature pattern. Specifically, not only a feature pattern in an original scale (level 0) but also additional two feature patterns in a small scale (level 1) and a big scale (level 2) are generated. Then, all the feature vectors are arranged as n×m multidimensional vectors (in matrix) as illustrated in FIG. 5.

As has been described above, according to this embodiment, the very effective matching method for the different types of image and graph (between an image and a graph, between images, and between graphs) is proposed. Further, this embodiment is applicable to automatic matching between different types of image and graph (for example, map, visible image, thermal image, blueprint, and CAD graph). Therefore, this embodiment is significant for many applications such as a GIS and remote sensing, in particular, matching of remote sensing images with maps.

Moreover, the embodiment of this invention is also applicable to matching between an image and a graph (or between images or between graphs) other than two-dimensional image/graph, such as matching between a two-dimensional image and a three-dimensional image (for example, point cloud data), and between a two-dimensional graph and a three-dimensional image.

Moreover, the feature pattern found in this embodiment is more robust than the conventional feature point.

As described above, according to the embodiment of this invention, the automatic, precise matching between the image and the graph (or between the images or between the graphs) can be realized while saving time therefor. Further, the matching method according to this embodiment is applicable to data fusion of various images and graphs.

While the present invention has been described in detail and pictorially in the accompanying drawings, the present invention is not limited to such detail but covers various obvious modifications and equivalent arrangements, which fall within the purview of the appended claims.

What is claimed is:

1. A computer system for matching between images, between graphs, and between an image and a graph, the computer system comprising:
    a processing unit for executing a program;
    a storage unit for storing the program executed by the processing unit;
    an input unit for receiving at least two of the image and the graph to be matched;
    a data recording unit for storing, in a storage device, the received image and the received graph;
    a feature pattern generating unit for generating a set of locoregional feature patterns of a plurality of sampling points allocated on each of the two of the image and the graph to be matched on the basis of the received image and the received graph;
    a correspondence computing unit for computing a correspondence between the two of the image and the graph to be matched by comparing the generated locoregional feature patterns;
    a transform unit for transforming a coordinate system of at least one of the image and the graph to be matched based on the computed correspondence; and
    a combination unit for combining the image and the graph that have been subjected to the transform of the coordinate system thereof,
    wherein the feature pattern generating unit is configured to:
    provide a moving point for each of the plurality of sample points, the moving point being positioned on a periphery of a circle centered on the corresponding one of the sample points;
    and for each of the sample points:
    segment a local region around the sample point on each of the two of the image and the graph into a plurality of concentric circle and ring regions centered on the sample point, scan the concentric circle and ring regions of each of the two of the image and graph along a scan line, which is defined with the sample point and the moving point as ends thereof, under a condition that an azimuth angle of the moving point is a particular angle to generate a feature vector of each of the two of the image and graph, repeatedly scan the concentric circle and ring regions along the scan line while the moving point is moved along the periphery of the circle by a predetermined center angle to generate a series of feature vectors; and combine the generated series of feature vectors to generate the locoregional feature pattern of each of the two of the image and graph regarding the point.

2. The computer system according to claim 1, wherein:

the feature pattern generating unit is further configured to:

count a number of significant pixels included in each of the concentric circle and ring regions along line;

obtain a normalized feature value of the each of the concentric circle and ring regions by dividing the counted number of significant pixels by a total number of pixels within each of the concentric circle and ring regions on the scan line; and generate the feature vectors each having the normalized feature values, as elements thereof.

3. The computer system according to claim 1, wherein the feature pattern generating unit is further configured to:

evaluate the generated feature patterns by using an angle between each of the feature vectors and a vector having all elements thereof equal to 1; and generate the set of the feature patterns including feature patterns determined to be good as a result of the evaluation.

4. The computer system according to claim 3, wherein the feature pattern generating unit is further configured to:

compute an angle between the each of the feature vectors and a central vector having all elements thereof equal to 1;

compute an average of all the angles of one of the plurality of sample points as an angle of the feature pattern;

determine whether the average of the angles between the feature vectors and the central vector falls within a given range;

determine whether a direction of a vector having the average of the angles is similar to a direction of the central vector by using a given threshold; and determine that the feature pattern of the one of the plurality of sample points is a good feature pattern in a case where it is determined that the direction of the vector having the average of the angles is similar to the direction of the central vector.

5. The computer system according to claim 3, wherein the feature pattern generating unit is further configured to:

select the good feature patterns so that an average of the angles of the feature patterns becomes smaller than a given threshold; and keep only a good feature pattern closest to the average of the angles of the feature patterns among the selected good feature patterns, and remove the other selected good feature patterns from the selected good feature patterns.

6. The computer system according to claim 1, further comprising a refinement unit for transforming shapes of modules included in the at least one of the image and the graph to be matched, according to coordinates obtained through the transform of the coordinate system to reduce derivatives of the modules, wherein the combination unit combines the image and the graph that have been subjected to refinement of the shapes of the modules.

7. The computer system according to claim 6, wherein the refinement unit is configured to:

extract edges in a destination image/graph of the image and the graph to be matched in the case where transforming the shapes of the modules; and deform edges in a source image/graph to fit the edges in the destination image/graph.

8. A method of matching between images, between graphs, and between an image and a graph using a computer, the method comprising:

an input step of receiving at least two of the image and the graph to be matched, and storing, in a storage device, the received image and the received graph;

a feature pattern generating step of generating a set of locoregional feature patterns of a plurality of sampling points allocated on each of the two of the image and the graph to be matched on the basis of the received image and the received graph;

a corresponding computing step of computing a correspondence between the image and the graph to be matched by comparing the generated locoregional feature patterns;

a transform step of transforming a coordinate system of at least one of the image and the graph to be matched based on the computed correspondence; and a combination step of combining the image and the graph that have been subjected to the transforming of the coordinate system thereof, wherein the feature pattern generating step further comprises:

providing a moving point for each of the plurality of sample points, the moving point being positioned on a periphery of a circle centered on the corresponding one of the points;

and for each of the sample points:

segmenting a local region around the sample point on each of the two of the image and the graph into a plurality of concentric circle and ring regions centered on the sample point, scanning the concentric circle and ring regions of each of the two of the image and graph along a scan line, which is defined with the sample point and the moving point as ends thereof, under a condition that an azimuth angle of the moving point is a particular angle to generate a feature vector of each of the two of the image and graph, repeatedly scanning the concentric circle and ring regions along the scan line while the moving point moves alone the periphery of the circle by a predetermined center angle to generate a series of feature vectors; and combining the generated feature vectors to generate the locoregional feature pattern of each of the two of the image and graph regarding the point.

9. The method of matching according to claim 8, wherein:

the feature pattern generating step further comprises:

counting a number of significant pixels included in each of the concentric circle and ring regions along the scan line;

obtaining a normalized feature value of the each of the concentric circle and ring regions by dividing the counted number of significant pixels by a total number of pixels within each of the concentric circle and ring regions on the scan line; and generating the feature vectors each having the normalized feature values, as elements thereof.

10. The method of matching according to claim 8, wherein the feature pattern generating step further comprises:

evaluating the generated feature patterns by using an angle between each of the feature vectors and a vector having all elements thereof equal to 1; and generating the set of the feature patterns including feature patterns determined to be good as a result of the evaluating.

11. The method of matching according to claim 10, wherein the feature pattern generating step further comprises:

computing an angle between the each of the feature vectors and a central vector having all elements thereof equal to 1;

computing an average of all the angles of one of the plurality of sample points as an angle of the feature pattern;

determining whether the average of the angles between the feature vectors and the central vector falls within a given range;

determining whether a direction of a vector having the average of the angles is similar to a direction of the central vector by using a given threshold; and determining that the feature pattern of the one of the plurality of sample points is a good feature pattern in a case where it is determined that the direction of the vector having the average of the angles is similar to the direction of the central vector.

12. The method of matching according to claim 10, further comprising, in the generating the set of the feature patterns:

selecting the good feature patterns so that an average of the angles of the feature patterns becomes smaller than a given threshold; and keeping only a good feature pattern closest to the average of the angles of the feature patterns among the selected good feature patterns, and removing the other selected good feature patterns from the selected good feature patterns.

13. The method of matching according to claim 8, further comprising, after the transform step, transforming shapes of modules included in the at least one of the image and the graph to be matched, according to coordinates obtained in the transforming the coordinate system to reduce derivatives of the modules, wherein the combination step comprises combining the image and the graph that have been subjected to refinement of the shapes of the modules.

14. The method of matching according to claim 13, further comprising, in the transforming the shapes of the modules:

extracting edges in a destination image/graph of the image and the graph to be matched; and deforming edges in a source image/graph to fit the edges in the destination image/graph.

\* \* \* \* \*